United States Patent
Comstock

(10) Patent No.: US 11,558,249 B2
(45) Date of Patent: *Jan. 17, 2023

(54) METHOD OF RADIO LINK MONITORING FOR MTC WITH COVERAGE ENHANCEMENT

(71) Applicant: Kyocera Corporation, Kyoto (JP)

(72) Inventor: David Comstock, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/514,854

(22) Filed: Oct. 29, 2021

(65) Prior Publication Data

US 2022/0052914 A1 Feb. 17, 2022

Related U.S. Application Data

(63) Continuation of application No. 16/609,432, filed as application No. PCT/US2018/032518 on May 14, 2018, now Pat. No. 11,212,167.

(Continued)

(51) Int. Cl.
*H04L 41/08* (2022.01)
*H04L 43/16* (2022.01)
(Continued)

(52) U.S. Cl.
CPC ...... *H04L 41/0806* (2013.01); *H04L 41/0813* (2013.01); *H04L 43/16* (2013.01); *H04W 24/08* (2013.01); *H04W 56/001* (2013.01)

(58) Field of Classification Search
CPC . H04L 41/0806; H04L 41/0813; H04L 43/16; H04W 24/08; H04W 56/001;
(Continued)

(56) References Cited

U.S. PATENT DOCUMENTS

| 2009/0285111 A1* | 11/2009 | Ou | H04W 72/1284 |
| | | | 370/252 |
| 2011/0081904 A1* | 4/2011 | Kuo | H04W 76/18 |
| | | | 455/425 |

(Continued)

OTHER PUBLICATIONS

Ericsson; "Relation between radio link failure and beam failure", R1-1705917; 3GPP TSG-RAN WG1 Meeting #88bis; Mar. 25, 2017; Spokane, US.

(Continued)

*Primary Examiner* — Ayanah S George

(57) ABSTRACT

A UE is configured to perform Radio Link Monitoring (RLM) with a first Coverage Enhancement (CE) configuration that provides a first CE level. The first RLM configuration associated with the first CE configuration has a first radio-link-quality-improving threshold value that corresponds with a third distance from a base station that is closer to the base station than a second distance associated with an in-sync radio link quality threshold value associated with a first RLM configuration. The first RLM configuration also has a first radio-link-quality-improving-cancellation threshold value that corresponds with a fourth distance from the base station that is located farther from the base station than the third distance and closer to the base station than the first distance. If conditions are satisfied, the base station reconfigures the UE with a second RLM configuration and a second CE configuration having a second CE level lower than the first CE level.

1 Claim, 3 Drawing Sheets

Related U.S. Application Data

(60) Provisional application No. 62/647,248, filed on Mar. 23, 2018, provisional application No. 62/506,470, filed on May 15, 2017.

(51) Int. Cl.

| | | |
|---|---|---|
| *H04W 24/08* | (2009.01) | |
| *H04W 56/00* | (2009.01) | |
| *H04W 4/70* | (2018.01) | |
| *H04W 36/30* | (2009.01) | |
| *H04W 64/00* | (2009.01) | |
| *H04W 36/00* | (2009.01) | |
| *H04B 17/30* | (2015.01) | |
| *H04L 41/0806* | (2022.01) | |
| *H04L 41/0813* | (2022.01) | |

(58) Field of Classification Search
CPC ..... H04W 4/70; H04W 36/305; H04W 64/00; H04W 36/0094; H04B 17/309
See application file for complete search history.

(56) References Cited

U.S. PATENT DOCUMENTS

| | | | |
|---|---|---|---|
| 2015/0016331 A1* | 1/2015 | Kim | ............... H04L 5/0032 370/312 |
| 2017/0048760 A1* | 2/2017 | Vajapeyam | ....... H04W 36/0083 |

OTHER PUBLICATIONS

Ericsson; "RLM and RLF in Nr", R2-1702677; 3GPP TSG-RAN WG2 #97bis; Mar. 24, 2017; Spokane, US.

Intel Corporation; "RLM enhancement for eNB-IoT and FeMTC", R2-1702997; 3GPP TSG-RAN WG2 #97bis; Mar. 25, 2017; Spokane, US.

Sequans Communications; "Out of range CE capable UEs". R2-1703682; 3GPP TSG-RAN WG2 #97bis; Mar. 25, 2017; Spokane, US.

LG Electronics Inc.; "Change of coverage enhancement level for RRC connected UE", R2-156758; 3GPP TSG-RAN2 Meeting #92; Nov. 16-20, 2015; Anaheim, US.

\* cited by examiner

METHOD OF RADIO LINK MONITORING FOR MTC WITH COVERAGE ENHANCEMENT

CLAIM OF PRIORITY

The present application is a continuation of and claims priority to U.S. application Ser. No. 16/609,432, entitled "METHOD OF RADIO LINK MONITORING FOR MTC WITH COVERAGE ENHANCEMENT" and filed on Oct. 29, 2019, which is a national stage application of PCT/US2018/032518, entitled "METHOD OF RADIO LINK MONITORING FOR MTC WITH COVERAGE ENHANCEMENT" and filed on May 14, 2018, which claims priority to Provisional Application No. 62/506,470, entitled "METHOD OF RADIO LINK MONITORING FOR MTC WITH COVERAGE ENHANCEMENT", filed May 15, 2017, and to Provisional Application No. 62/647,248, entitled "METHOD OF RADIO LINK MONITORING FOR MTC WITH COVERAGE ENHANCEMENT", filed Mar. 23, 2018, all of which are assigned to the assignee hereof and hereby expressly incorporated by reference in their entirety.

FIELD

This invention generally relates to wireless communications and more particularly to adapting coverage configurations for a user equipment device.

BACKGROUND

In mobile radio systems, such as those based on the 3rd Generation Partnership Project Long Term Evolution (3GPP LTE) standard, if the signal quality received at a user equipment (UE) device degrades past a certain degree, it is not possible for the UE device to maintain synchronization with the network, and the UE device will lose connection with the network. UE devices typically continuously monitor the quality of the radio signal in order to gracefully manage the degradation of the signal quality and to re-establish a connection with the network in a controlled manner. When a UE device detects a Radio Link Failure (RLF) using established monitoring criteria, it performs an established procedure to select another operating base station for reconnecting to the network such that the operational impact is reduced.

SUMMARY

A user equipment (UE) device is configured to perform Radio Link Monitoring (RLM) with a first Coverage Enhancement (CE) configuration that provides a first CE level. A first RLM configuration associated with the first CE configuration includes a first radio signal level threshold value that is associated with an improving radio link signal quality status (e.g., a radio-link-quality-improving threshold value) and that corresponds with a third distance from a base station that is closer to the base station than a second distance associated with an in-sync radio link quality threshold value associated with the first RLM configuration. The first RLM configuration also has a first radio signal level threshold value that is associated with the negation of an improving radio link signal quality status (e.g., radio-link-quality-improving-cancellation threshold value) and that corresponds with a fourth distance from the base station that is located farther from the base station than the third distance and closer to the base station than the first distance. If a Radio Link Quality Improvement event occurs before a Radio Link Quality Improvement Cancellation event occurs, the base station reconfigures the UE device with a second CE configuration and a second RLM configuration. The second CE configuration has a second CE level lower than the first CE level.

DETAILED DESCRIPTION

Figure 1:
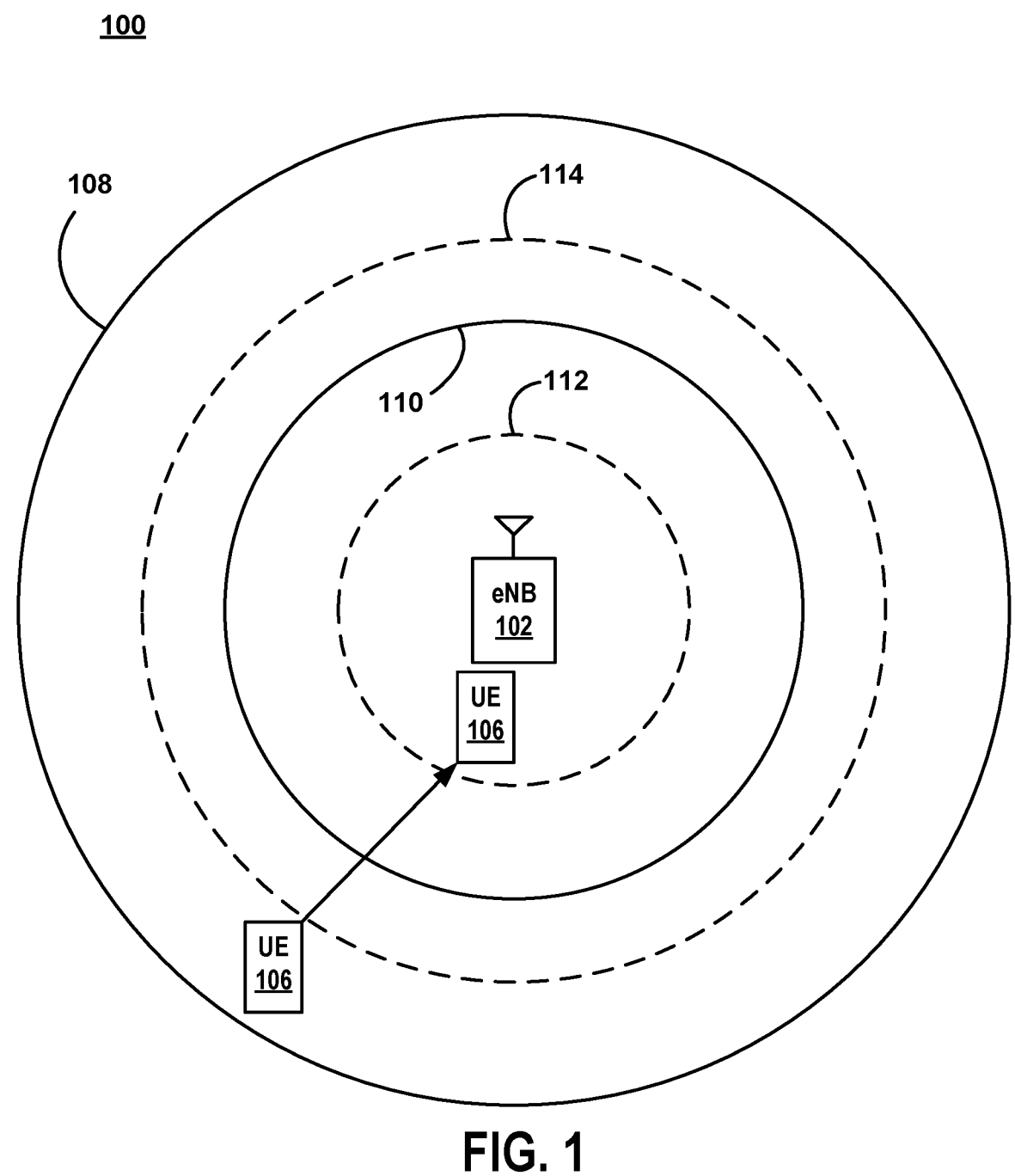
FIG. 1 is a block diagram of an example of a communication system configured to perform Radio Link Monitoring for Machine Type Communication with Coverage Enhancement.

According to the Radio Link Monitoring procedure in 3GPP Technical Specifications, the Physical layer in the UE device shall every radio frame assess the radio link quality, evaluated over the previous time period. The UE device shall estimate the downlink radio link quality and compare the estimated downlink radio link quality to the threshold values, Qout and Qin, for the purpose of monitoring downlink radio link quality of the Primary Cell (PCell). The threshold value Qout is defined as the level at which the downlink radio link cannot be reliably received and shall correspond to 10% block error rate of a hypothetical Physical Downlink Control Channel (PDCCH) transmission, taking into account the Physical Control Format Indicator Channel (PCFICH) errors with transmission parameters configured by the base station. The threshold value Qin is defined as the level at which the downlink radio link quality can be significantly more reliably received than at Qout and shall correspond to 2% block error rate of a hypothetical PDCCH transmission, taking into account the PCFICH errors with transmission parameters configured by the base station.

When the downlink radio link quality of the PCell or Primary Secondary Cell (PSCell) estimated over the last 200 ms period becomes worse than the threshold value Qout, Layer 1 (e.g., Physical layer, according to the Open Systems Interconnection (051) model) of the UE device shall send an out-of-sync indication for the PCell or the PSCell to the higher layers within the 200 ms Qout evaluation period. A Layer 3 (e.g., Network layer, according to the OSI model) filter shall be applied to the out-of-sync indications before the UE device is declared to be out of synchronization. The Layer 3 filtering for the out-of-sync cases comprises an out-of-sync indicator counter and a timer. A base station provides values for these parameters (e.g., for the counter and the timer) during configuration. One such counter in the LTE specifications for out-of-sync evaluation is N310 and its associated timer is T310.

When the downlink radio link quality of the PCell or Primary Secondary Cell (PSCell) estimated over the last 100 ms period becomes better than the threshold value Qin, Layer 1 of the UE device shall send an in-sync indication for the PCell or the PSCell to the higher layers within the 100 ms $Q_{in}$ evaluation period. A Layer 3 filter shall be applied to the in-sync indications before the UE device is declared to be in synchronization. The Layer 3 filtering for the in-sync cases comprises an in-sync indicator counter. A base station provides values for this parameter (e.g., for the counter) during configuration. An example of such a counter in the LTE specifications is N311.

In operation, the base station configures the UE device with required parameter values, such as the values for the counters and timers, as well as the configuration of the hypothetical PDCCH transmissions used to evaluate the radio link quality and the radio signal quality threshold values. More specifically, the base station transmits the required parameter values to the UE device to configure the Radio Link Monitoring configurations described herein. Every frame time of 10 ms, the UE device assesses the radio link quality over the previous evaluation time. In this example, the evaluation time for the out-of-sync condition is 200 ms and for the in-sync condition is 100 ms.

If the estimated radio link level is above Qin, an in-sync indication is sent to Layer 3. If the estimated radio link level is below Qout, an out-of-sync indication is sent to Layer 3. If the number of consecutive out-of-sync indications is equal to the configured value of N310, the UE device starts timer T310. If the number of consecutive in-sync indications is equal to the configured value of N311, timer T310 is reset. If the timer T310 expires before receiving N311 in-sync indications, a Radio Link Failure is declared, and the UE device will perform connection recovery procedures.

One aspect of the LTE MTC Machine Type Communication (MTC) feature is Coverage Enhancement (CE), which allows UE devices to transmit and receive signals over longer distances from a base station. The degree to which the coverage is extended is configured by a base station by providing the UE device with relevant configuration parameter values, such as the level of repetition, aggregation, and the CE mode for the MTC PDCCH. The CE capability provides the opportunity to enhance MTC, and RLM is enhanced to support it.

One such enhancement is to change the CE level when the radio link level is consistently high. If the UE device does not travel far from the base station transmitter, the UE device does not require a large CE level and may be overprovisioned if the UE device is consistently measuring a high radio link level. This is a waste of resources, and it would be preferable to change the CE configuration for the UE device. Threshold values are needed to trigger the UE device to request a CE reconfiguration from the base station. The examples described herein illustrate various techniques for configuring and reconfiguring the CE configuration for a UE device based on the measured radio link levels of the UE device.

FIG. 1 is a block diagram of an example of a communication system configured to perform Radio Link Monitoring for Machine Type Communication with Coverage Enhancement. The communication system 100 is part of a radio access network (not shown) that provides various wireless services to UE devices that are located within the respective service areas of the various base stations that are part of the radio access network.

In the interest of clarity and brevity, communication system 100 is shown as having only one base station 102. However, in other examples, communication system 100 could have any suitable number of base stations. In the example of FIG. 1, at least a portion of the service area (cell) for base station 102 covers at least the area indicated by the outermost threshold distance 108. Although the service area of base station 102 is represented by a single circle, a typical communication system 100 would have a plurality of cells, each having variously shaped geographical service areas, some of which may partially or entirely overlap other cells.

Base station 102, sometimes referred to as an eNodeB or eNB, communicates with the wireless user equipment (UE) device 106 by transmitting downlink signals when connected to UE device 106. Base station 102 receives uplink signals transmitted from the UE device 106 when connected to UE device 106. The UE device 106 is any wireless communication device such as a mobile phone, a transceiver modem, a personal digital assistant (PDA), a tablet, or a smartphone, for example.

Figure 2A:
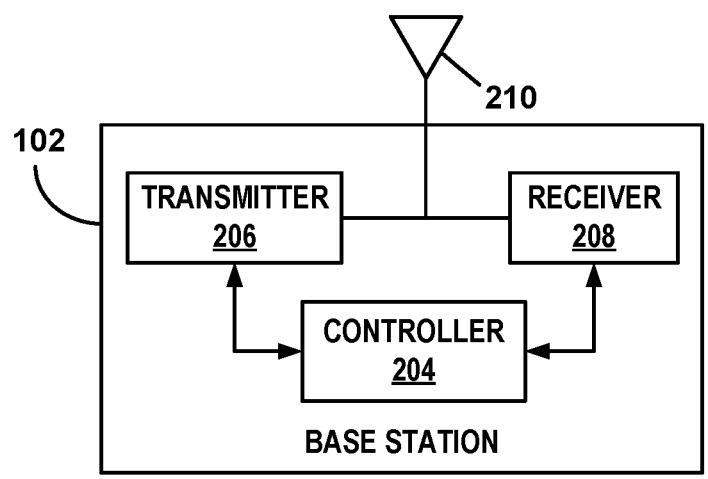
FIG. 2A is a block diagram of an example of the base station shown in FIG. 1.

Base station 102 is connected to the network through a backhaul (not shown) in accordance with known techniques. As shown in FIG. 2A, the base station 102 comprises controller 204, transmitter 206, and receiver 208, as well as other electronics, hardware, and code. In other examples, the base station 102 may have circuitry and/or a configuration that differs from that of the base station 102 shown in FIG. 2A.

The base station 102 is any fixed, mobile, or portable equipment that performs the functions described herein. The various functions and operations of the blocks described with reference to the base station 102 may be implemented in any number of devices, circuits, or elements. Two or more of the functional blocks may be integrated in a single device, and the functions described as performed in any single device may be implemented over several devices.

For the example shown in FIG. 2A, the base station 102 may be a fixed device or apparatus that is installed at a particular location at the time of system deployment. Examples of such equipment include fixed base stations or fixed transceiver stations. In some situations, the base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 102 may be a portable device that is not fixed to any particular location.

The controller 204 includes any combination of hardware, software, and/or firmware for executing the functions described herein as well as facilitating the overall functionality of the base station 102. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals and can apply any one of a plurality of modulation orders. The demodulator demodulates any uplink signals received at the base station 102 in accordance with one of a plurality of modulation orders.

Figure 2B:
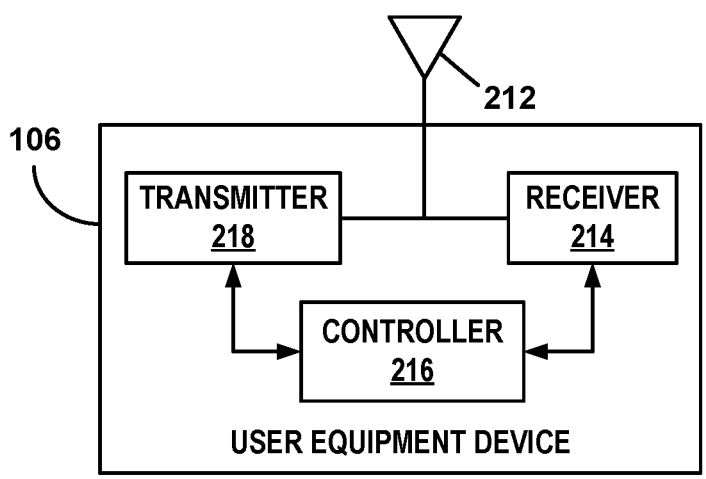
FIG. 2B is a block diagram of an example of the UE device shown in FIG. 1.

Returning to FIG. 1, the communication system 100 provides various wireless services to UE device 106 via base station 102. For the examples herein, the communication system 100 operates in accordance with at least one revision of the 3rd Generation Partnership Project Long Term Evolution (3GPP LTE) communication specification. UE device 106 is served by base station 102. Thus, UE device 106 receives downlink signals via antenna 212 and receiver 214, as shown in FIG. 2B. Besides antenna 212 and receiver 214, UE device 106 further comprises controller 216 and transmitter 218, as well as other electronics, hardware, and code. UE device 106 is any fixed, mobile, or portable equipment that performs the functions described herein. The various functions and operations of the blocks described with reference to UE device 106 may be implemented in any number of devices, circuits, or elements. Two or more of the functional blocks may be integrated in a single device, and the functions described as performed in any single device may be implemented over several devices.

The controller 216 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters. The receiver 214 includes electronics configured to receive wireless signals. In some situations, the receiver 214 may include multiple receivers. The receiver 214 and transmitter 218 receive and transmit signals, respectively, through antenna 212. The antenna 212 may include separate transmit and receive antennas. In some circumstances, the antenna 212 may include multiple transmit and receive antennas.

The transmitter 218 and receiver 214 in the example of FIG. 2B perform radio frequency (RF) processing including modulation and demodulation. The receiver 214, therefore, may include components such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UE device.

The transmitter 218 includes a modulator (not shown), and the receiver 214 includes a demodulator (not shown). The modulator can apply any one of a plurality of modulation orders to modulate any uplink signals that are to be transmitted by the UE device 106. The demodulator demodulates any received downlink signals in accordance with one of a plurality of modulation orders.

In operation, base station 102 configures UE device 106 to perform Radio Link Monitoring (RLM) with a first RLM configuration. The first RLM configuration has a first out-of-sync radio link quality threshold value (e.g., referred to above as Qout) that corresponds with a first distance 108 from the base station 102. The first RLM configuration also has a first in-sync radio link quality threshold value (e.g., referred to above as Qin) that corresponds with a second distance 110 that is closer to the base station 102 than the first distance 108. In the example shown in FIG. 1, the first in-sync radio link quality threshold value corresponds to a 2% Block Error Rate (BLER) at the second distance 110 from the base station, and the first out-of-sync radio link quality threshold value corresponds to a 10% BLER at the first distance 108 from the base station 102. In other examples, any other suitable values may be used for the first in-sync radio link quality threshold value and the first out-of-sync radio link quality threshold value.

The base station 102 further configures the UE device 106 with additional RLM parameters for a first Coverage Enhancement (CE) configuration that corresponds with a first CE level. The first CE configuration has an associated first radio-link-quality-improving threshold value (e.g., Qin+) that corresponds with a third distance 112 from the base station 102, the third distance 112 being closer to the base station 102 than the second distance 110. The first CE configuration also has an associated first radio-link-quality-improving-cancellation threshold value (e.g., Qout-in+) that corresponds with a fourth distance 114 from the base station 102. The fourth distance 114 is located farther from the base station 102 than the third distance 112 and closer to the base station 102 than the first distance 108.

As shown in FIG. 1, when the first CE configuration is utilized and the UE device 106 moves from a position that is between first distance 108 and second distance 110 to a position that is close enough to the base station 102, the UE device 106 may be overprovisioned, such that more radio resources are allocated for the UE device 106 than are necessary for reliable communication with the base station 102. The amount of allocated radio resources is affected by the CE configuration, including the level of repetition, aggregation, and the CE mode. A new threshold value is added to the RLM procedures to determine whether the UE device 106 should request to be reconfigured to use a second CE configuration instead of the first CE configuration in order to reduce the amount of resources being used, such that the UE device 106 is suitably provisioned. The new threshold value is referred to as a first radio-link-quality-improving threshold value (e.g., Qin+) that is associated with the first Coverage Enhancement (CE) configuration, which corresponds with the first CE level. In some cases, the first radio-link-quality-improving threshold value may also represent an in-sync threshold value associated with a second CE configuration.

An additional threshold value is added to the RLM procedures to aid in determining if the UE device 106 moves far enough away from the base station 102 such that a second CE level would not consistently provide a minimum quality of radio signal to the UE device 106 and so a pending CE reconfiguration request should be canceled. This additional threshold value is referred to as a first radio-link-quality-improving-cancellation threshold value (e.g., Qout-in+) that is associated with the first CE configuration and that may also represent an out-of-sync threshold value associated with a second CE configuration. In some cases, the first radio-link-quality-improving threshold value and the first radio-link-quality-improving-cancellation threshold value are determined in a similar way as the first in-sync and first out-of-sync threshold values. In the example shown in FIG. 1, the first radio-link-quality-improving threshold value associated with a first CE configuration may be the 2%

BLER in-sync threshold value associated with a second CE configuration, and the first radio-link-quality-improving-cancellation threshold value associated with the first CE configuration may be the 10% BLER out-of-sync threshold value associated with the second CE configuration.

In some cases, the base station 102 provides a first set of parameter values (e.g., for the counter, timer, and configuration of the hypothetical PDCCH transmissions) for determining the first radio-link-quality-improving threshold value and a second set of parameter values for determining the first radio-link-quality-improving-cancellation threshold value in the same manner as the first in-sync radio link quality threshold value and the first out-of-sync radio link quality threshold value, respectively. In other cases, the base station 102 provides a first set of parameter values for determining the first radio-link-quality-improving threshold value, and the UE device 106 determines the first radio-link-quality-improving-cancellation threshold value based on the determined first radio-link-quality-improving threshold value.

In still other cases, the first radio-link-quality-improving threshold value may be configured relative to the first in-sync radio link quality threshold value, such as a BLER value or a radio link level relative to the first in-sync radio link quality threshold value. For example, the UE device 106 may determine the first radio-link-quality-improving threshold value based on a first offset relative to the first in-sync radio link quality threshold value. Similarly, the UE device 106 may determine the first radio-link-quality-improving-cancellation threshold value based on a second offset relative to the first out-of-sync radio link quality threshold value. In these cases, the first offset and the second offset may be based on a Block Error Rate (BLER) value and/or a radio link level.

In some cases, the base station 102 is requested by the UE device 106 to reconfigure the UE device 106 with a second CE configuration when it is determined that a Radio Link Quality Improvement event has occurred. For example, a Radio Link Quality Improvement event may be declared by the UE device 106 when one or more radio-link-quality-improving events have occurred. A radio-link-quality-improving event occurs when a quality measurement of a signal received at the UE device 106 is greater than the first radio-link-quality-improving threshold value. In some cases, the UE device 106 cancels a pending request to the base station to reconfigure the UE device 106 with a second CE configuration when it is determined that a Radio Link Quality Improvement Cancellation event has occurred. For example, a Radio Link Quality Improvement Cancellation event may be declared by the UE device 106 when one or more radio-link-quality-improving-cancellation events have occurred. A radio-link-quality-improving-cancellation event occurs when a quality measurement of a signal received at the UE device 106 is less than the first radio-link-quality-improving-cancellation threshold value. In some cases, the UE device 106 may declare that a Radio Link Quality Improvement event has occurred after Layer 3 filtering of radio-link-quality-improving events. As described above, Layer 3 filtering may utilize an event counter and a timer to determine whether a Radio Link Quality Improvement event has occurred, in an analogous manner as the determination that the UE device 106 is out of synchronization. In some cases, the UE device 106 may determine that a Radio Link Quality Improvement Cancellation event has occurred after Layer 3 filtering of radio-link-quality-improving-cancellation events. In this case, Layer 3 filtering may utilize an event counter to determine whether a Radio Link Quality Improvement Cancellation event has occurred, in an analogous manner as the determination that the UE is in synchronization.

If the measured signals indicate that the UE device 106 requires a lower level CE configuration than that of the first CE configuration, the base station 102 reconfigures the UE device 106 with a second CE configuration and to perform RLM associated with a second CE configuration that has a second CE level that is lower than the first CE level, which is associated with the first CE configuration. Similar to the discussion above in connection with the first CE configuration having a first radio-link-quality-improving threshold value and a first radio-link-quality-improving-cancellation threshold value, the second CE configuration would have an associated second radio-link-quality-improving threshold value and an associated second radio-link-quality-improving-cancellation threshold value, at least one of which would be respectively different than the first radio-link-quality-improving threshold value and the first radio-link-quality-improving-cancellation threshold value.

In still other examples, when the UE device 106 is underprovisioned, such that fewer radio resources are allocated for the UE device 106 than are necessary for reliable communication with the base station 102, the base station 102 is triggered by the UE device 106 to reconfigure the UE device 106 with a third CE configuration when it is determined that a Radio Link Quality Degradation event has occurred using the same threshold value as the Radio Link Quality Improvement Cancellation event. In this case, Layer 3 signaling parameters may comprise a counter and timer, and if a Radio Link Quality Degradation Cancellation event occurs, a pending Radio Link Quality Degradation event is cancelled. The Radio Link Quality Degradation Cancellation event is determined using the same threshold value as the Radio Link Quality Improvement event, and Layer 3 filtering parameters may comprise a counter.

In still further examples, if the measured signals indicate that the UE device 106 requires a higher level CE configuration than that of the first CE configuration, the base station 102 would reconfigure the UE device 106 with a third CE configuration and to perform RLM associated with a third CE configuration that has a third CE level that is higher than the first CE level. Similar to the discussion above in connection with the first CE configuration having a first radio-link-quality-improving threshold value and a first radio-link-quality-improving-cancellation threshold value, the third CE configuration would have an associated third radio-link-quality-improving threshold value and an associated third radio-link-quality-improving-cancellation threshold value, at least one of which would be respectively different than the first radio-link-quality-improving threshold value and the first radio-link-quality-improving-cancellation threshold value.

Moreover, although not explicitly shown, the UE device 106 transmits information regarding a Radio Link Quality Improvement event to the base station 102 so that the base station 102 can determine whether to reconfigure the UE device 106. Furthermore, although the foregoing discussion describes the measured signals as triggering the reconfiguration of the UE device 106, the UE device 106 may transmit a request for a CE reconfiguration to the base station 102, in other cases.

Figure 3:
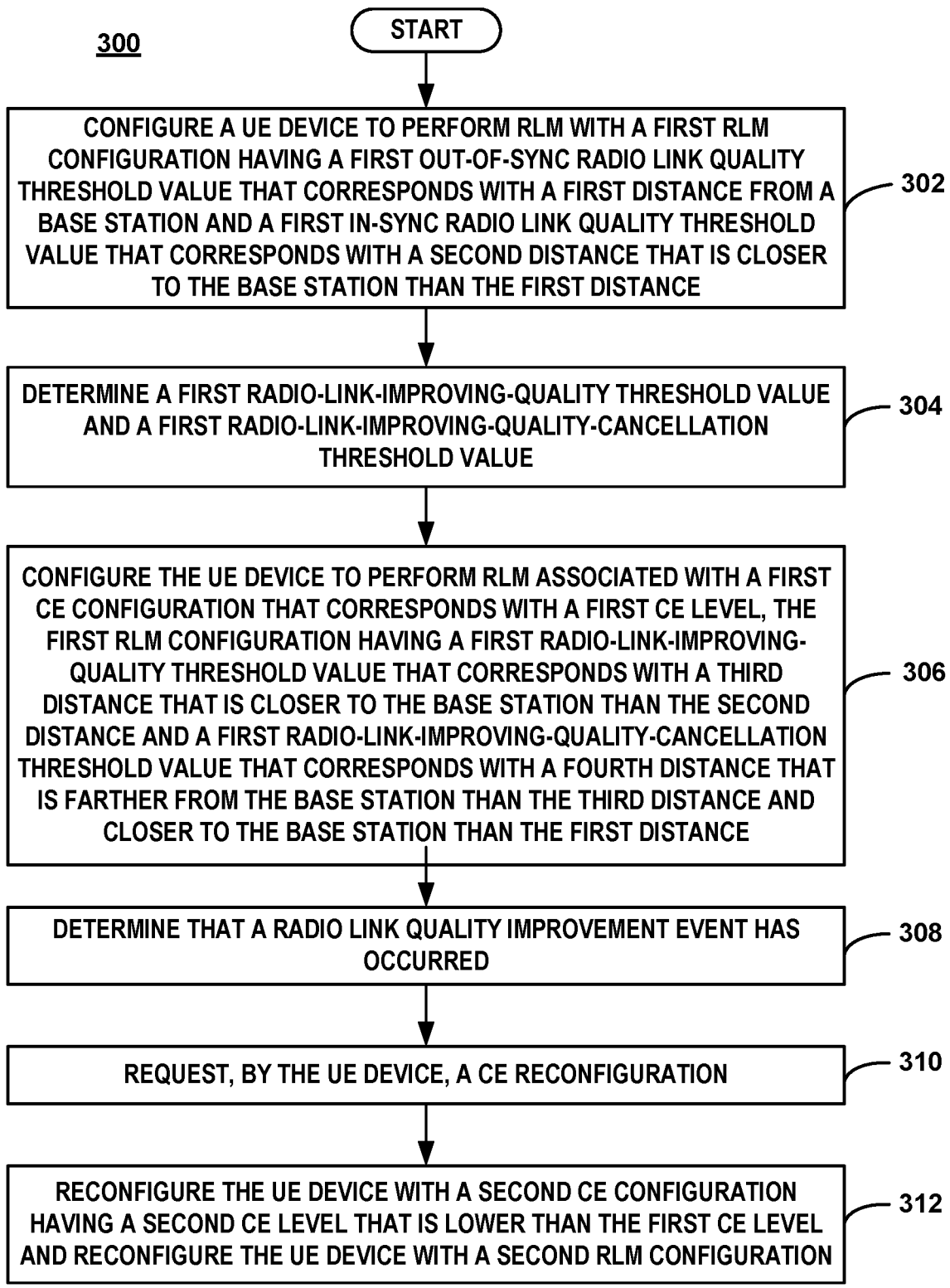
FIG. 3 is a flowchart of an example of a method for reconfiguring a Coverage Enhancement configuration of a UE device.

FIG. 3 is a flowchart of an example of a method for reconfiguring a Coverage Enhancement configuration of a UE device. The steps of method 300 may be performed in a different order than described herein and shown in the example of FIG. 3. Furthermore, in some examples, one or more of the steps may be omitted. Moreover, in other examples, one or more additional steps may be added.

The method 300 begins at step 302 with configuring a user equipment (UE) device 106 to perform Radio Link Monitoring (RLM) with a first RLM configuration having a first out-of-sync radio link quality threshold value that corresponds with a first distance 108 from a base station 102 serving the UE device 106. The first RLM configuration also has a first in-sync radio link quality threshold value that corresponds with a second distance 110 that is closer to the base station 102 than the first distance 108.

At step 304, a first radio-link-quality-improving threshold value and a first radio-link-quality-improving-cancellation threshold value are determined. In some cases, the base station 102 provides first and second sets of parameter values to the UE device 106 for determining the first radio-link-quality-improving threshold value and the first radio-link-quality-improving-cancellation threshold value, respectively. In other cases, the base station 102 provides a first set of parameter values to the UE device 106 for determining the first radio-link-quality-improving threshold value, and the UE device 106 determines the first radio-link-quality-improving-cancellation threshold value based on the determined first radio-link-quality-improving threshold value.

In still other cases, the UE device 106 determines the first radio-link-quality-improving threshold value based on a first offset relative to the first in-sync radio link quality threshold value. The UE device 106 also determines the first radio-link-quality-improving-cancellation threshold value based on a second offset relative to the first out-of-sync radio link quality threshold value. In some cases, the first and second offsets are based on a Block Error Rate (BLER) value or a radio link level.

At step 306, the base station 102 configures the UE device 106 to perform RLM for a first Coverage Enhancement (CE) configuration that corresponds with a first CE level. The RLM configuration has a first radio-link-quality-improving threshold value that corresponds with a third distance 112 from the base station 102. The third distance 112 is closer to the base station 102 than the second distance 110. The RLM configuration also has a first radio-link-quality-improving-cancellation threshold value that corresponds with a fourth 114 distance from the base station 102. The fourth distance 114 is located farther from the base station 102 than the third distance 112 and closer to the base station 102 than the first distance 108.

At step 308, the UE device 106 determines that a Radio Link Quality Improvement event has occurred. In some cases, determining that the Radio Link Quality Improvement event has occurred comprises determining that one or more radio-link-quality-improving events has occurred. A radio-link-quality-improving event occurs when a quality measurement of a signal received at the UE device 106 is greater than the first radio-link-quality-improving threshold value.

At step 310, the UE device 106 requests a CE reconfiguration. At step 312, the base station 102 reconfigures the UE device 106 with a second CE configuration, which has a second CE level that is lower than the first CE level, and reconfigures the UE device 106 with a second RLM configuration associated with the second CE configuration.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. An apparatus for controlling a user equipment (UE) device, the apparatus comprising a processor and a memory, the processor configured to:
    receive Radio Link Monitoring (RLM) configuration from a base station serving the UE device;
    start a timer when a third layer of the UE device receives first numbers of consecutive first indications from a physical layer of the UE device after the receiving, the third layer being higher layer than the physical layer, each of the first indications being different from in-sync indication or out-of-sync indication;
    detect an event when the timer expires; and
    transmit information regarding the event to the base station after the detecting.

* * * * *